United States Patent
Lewis (10) Patent No.: US 11,507,700 B2
(45) Date of Patent: Nov. 22, 2022

(54) FIRMWARE-BASED METHOD FOR SECURELY ENABLING HARDWARE DEVICES DURING A COMPUTING PLATFORM BOOT SEQUENCE

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 233 days.

(21) Appl. No.: 17/062,927

(22) Filed: Oct. 5, 2020

(65) Prior Publication Data

US 2021/0103680 A1 Apr. 8, 2021

Related U.S. Application Data

(60) Provisional application No. 62/910,118, filed on Oct. 3, 2019.

(51) Int. Cl.

| | |
|---|---|
| *G06F 21/73* | (2013.01) |
| *G06F 21/57* | (2013.01) |
| *G06F 8/65* | (2018.01) |
| *G06F 11/16* | (2006.01) |
| *G06F 11/14* | (2006.01) |
| *G06F 21/31* | (2013.01) |

(52) U.S. Cl.
CPC ............. *G06F 21/73* (2013.01); *G06F 8/65* (2013.01); *G06F 11/1417* (2013.01); *G06F 11/1658* (2013.01); *G06F 21/31* (2013.01); *G06F 21/572* (2013.01); *G06F 21/575* (2013.01)

(58) Field of Classification Search
None
See application file for complete search history.

(56) References Cited

U.S. PATENT DOCUMENTS

| | | | |
|---|---|---|---|
| 9,177,122 B1* | 11/2015 | Trier | G06F 21/10 |
| 9,881,158 B2 | 1/2018 | Western et al. | |
| 2008/0005415 A1* | 1/2008 | Lopez | G06F 13/385 |
| | | | 710/62 |
| 2014/0331037 A1* | 11/2014 | Lewis | G06F 9/4401 |
| | | | 713/2 |

* cited by examiner

*Primary Examiner* — Nelson S. Giddins
(74) *Attorney, Agent, or Firm* — McCarter & English, LLP; John S. Curran, Esq.

(57) ABSTRACT

A secure computing platform and method for securely enabling inserted or replacement hardware devices during boot of a computing platform are discussed. More particularly, an authorized list holding identifying information associated with approved insertable or replaceable hardware devices is maintained in non-volatile storage and checked by the firmware during a platform boot sequence against identifying information provided by the inserted or replacement hardware devices. Only devices whose information matches the stored authorized list information are enabled.

19 Claims, 5 Drawing Sheets

FIRMWARE-BASED METHOD FOR SECURELY ENABLING HARDWARE DEVICES DURING A COMPUTING PLATFORM BOOT SEQUENCE

RELATED APPLICATION

This application claims priority to, and the benefit of, U.S. Provisional Patent Application No. 62/910,118, entitled "Firmware-Based Method For Securely Enabling Hardware Devices During a Computing Platform Boot Sequence", filed Oct. 3, 2019, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto non-volatile Read-Only Memory (ROM) modules including, but not limited to, ROM, PROM, EPROM, EEPROM, and Flash memory (collectively referred to hereafter as "ROM"). A characteristic of non-volatile memory is that it retains data when power is withdrawn. In contrast, volatile memory loses data in the absence of power. For example, volatile Random Access Memory (RAM) loses its data when a computer is shut down while the various types of non-volatile ROM maintain their data through shutdown and re-boot. Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The ROM in a computing device may be partitioned into several functional divisions or regions. One such region is the code store which must be protected from alteration by any entity except for entities that have been authorized to update the code store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data, the UEFI specification provides that the Authenticated Variable Region/Store must be protected from alteration by any entity except those authorized by the presence of identifying key data within the security database. A third region, the UEFI variable store, contains lower security information which may be freely updated by user programs.

BRIEF SUMMARY

Embodiments of the present invention provide a system and method for securely enabling inserted or replacement hardware devices during boot of a computing platform. More particularly, an authorized list holding identifying information associated with approved insertable or replaceable hardware devices is maintained in non-volatile storage and checked by the firmware during the device enumeration phase of a computing platform boot sequence against identifying information provided by the inserted or replacement hardware devices. Only devices whose information matches the stored authorized list information are enabled.

In one embodiment, a method for enabling inserted or replacement hardware devices during boot of a computing platform equipped with firmware and one or more processors, includes maintaining in non-volatile storage an authorized list of identifying information associated with approved insertable or replaceable hardware devices. The method also includes identifying, during enumeration of hardware devices during a boot sequence executed by the firmware of the computing platform, an inserted or replacement hardware device and determining, with the firmware, current identifying information for the identified inserted or replacement hardware device during the boot sequence. The method further compares, with the firmware, the current identifying information against the stored identifying information in the authorized list and enables the identified inserted or replacement hardware device during the boot sequence based on a match during the comparison.

In another embodiment, a system for a secure computing platform includes one or more processors, firmware and non-volatile storage configured to maintain an authorized list of identifying information associated with approved insertable or replaceable devices. The firmware when executed identifies during a hardware device enumeration phase during a boot sequence of the secure computing platform, an inserted or replacement hardware device. The firmware also determines current identifying information for the identified inserted or replacement hardware device during the boot sequence and compares the current identifying information against identifying information in the authorized list. The firmware further enables the identified inserted or replacement hardware device during the boot sequence based on a match during the comparison.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 1 (prior art) depicts an exemplary sequence of steps by which a computing platform conventionally enables hardware devices during a platform boot sequence.

DETAILED DESCRIPTION

Figure 1:
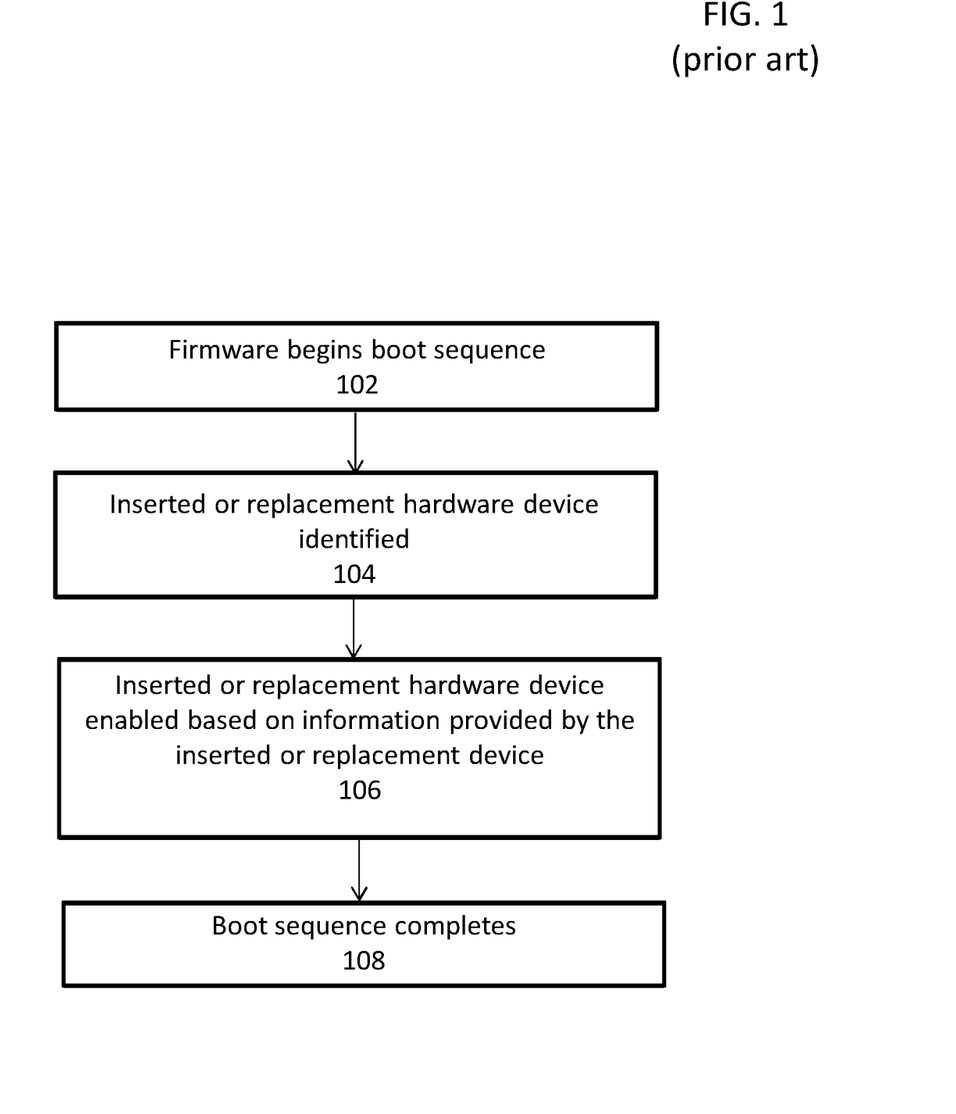

Some hardware devices provide information that is used to identify and configure the devices before hardware protections are enabled. For example, the information may take the form of DIMM Serial Presence Detect (SPD) EEPROMs, SMBus UUIDs, USB device descriptors or ATA ID information that can be used to either identify a type of device or a specific device. FIG. 1 (prior art) depicts an exemplary sequence of steps by which a computing platform conventionally enables devices during a platform boot sequence. The sequence begins with firmware on the computing platform beginning a boot sequence (step 102). During the boot sequence an inserted or replacement hardware device (such as, but not limited to a replacement DIMM) is identified (step 104). The inserted or replacement hardware device provides information to the firmware and is enabled based on the information provided by the detected device (step 106). The boot sequence then completes with the inserted or replacement device in an enabled state (step 108).

Unfortunately, in security threat models for firmware, one of the threat vectors is data provided by external devices that is processed while the system is still in its least protected phase during the boot sequence for the computing platform because hardware protections have not all been enabled. While the firmware at this time is usually provide by the OEM, the firmware still must deal with hardware devices that can be inserted or replaced on the platform, such as, but not limited to, hardware devices that can be plugged into an external port or attached to the motherboard. As noted, some of these hardware devices provide information that is used to identify and configure the devices before hardware protections are enabled. This information may be manipulated by a hacker to force the platform into untested paths or paths that leave certain protections disabled. Certain platforms, like kiosks, remote monitoring systems and other embedded systems are physically insecure and people can insert different types of devices into ports and slots without the devices being validated or tested.

One conventional solution is to disable or ignore these inserted or replacement devices during the pre-OS environment entirely. For example, one conventional approach is to use only hard-coded memory configurations instead of reading SPD data. However, this limits configuration flexibility for the computing platform.

Embodiments of the present invention attempt to address this vulnerability so as to make sure insecure inserted or replacement hardware devices are not enabled on the computing platform. In one embodiment, on a secure system where only components from an authorized vendor list are allowed to be enabled on the computing platform, UEFI firmware maintains an authorized list of hardware devices that are to be enabled during boot. The authorized list may be created at build, enrolled by an authorized user at runtime, and/or updated as part of a firmware update such as an update provided via a UEFI capsule as described in U.S. patent application Ser. No. 16/270,841, the contents of which are incorporated herein by reference. The authorized list of hardware devices contains identifying information associated with insertable or replaceable hardware devices from authorized vendors. In one embodiment the identifying information takes the form of hashes of DIMM SPD EEPROMs, SMBus UUIDs, USB device descriptors, or ATA ID information that can be used to either identify a type of device or a specific device. The authorized list can further include unique device identifiers such as a USB WWID.

In one embodiment, the authorized list is a list of hashes per device type. Each hash is a form of device identifying information. The hashes and the authorized list are stored in non-volatile storage, such as, but not limited to, a flash region of ROM, a trusted platform module, a UEFI variable and/or memory locations that are read-only after completion of a boot sequence. During the hardware device enumeration phase of the boot sequence, the device information of the discovered device is identified, hashed and compared against the hashes that were stored in the authorized list. If there is a match, the hardware device is enabled. Otherwise, the hardware device is disabled or (if that is not possible) ignored. In another embodiment, actual device information rather than a 32 byte hash is stored. This alternative may trade storage space for speed (since no hash of the information from the discovered device would be required).

In one embodiment the authorized list of hashes can be pre-built when the firmware image was created. In an embodiment, the authorized list of hashes can be updated by inserting a hardware device and enrolling a hash of that device's information or updated from a pre-built list on a storage device. This updating can be done during the pre-OS environment and can be limited to when the user has inputted a supervisor password or when the system is determined to be in a safe environment or manufacturing mode. In one embodiment the authorized list of hashes can be updated using a flash application that either uses a private interface to the BIOS or a UEFI capsule that can be signed.

The hashes can be calculated from different forms of hardware descriptor, such as DIMM SPD EEPROMs, a USB device descriptor, PCI config space read-only registers and SATA device descriptors. This hash can either be the static device information or specific device identification information (such as a WWID). Each of the types of devices has a slightly different enumeration methodology. For example, DIMMs are enumerated during the memory initialization process that varies per silicon vendor. When the hash does not match, the DIMM is disabled (if possible) as if there was an error or the DIMM was not present. USB buses have a well-defined enumeration process that utilizes USB device descriptors and if the hash of the device descriptor does not match the stored hash from the authorized list, the device is treated as if it had an error or was not present. SATA buses also have a well-defined enumeration process and devices have ID drive information and if the hash of an identified hardware device does not match a stored hash, the device is treated as if it had an error or was not present. Similar approaches can be used with other enumerable devices.

Figure 2:
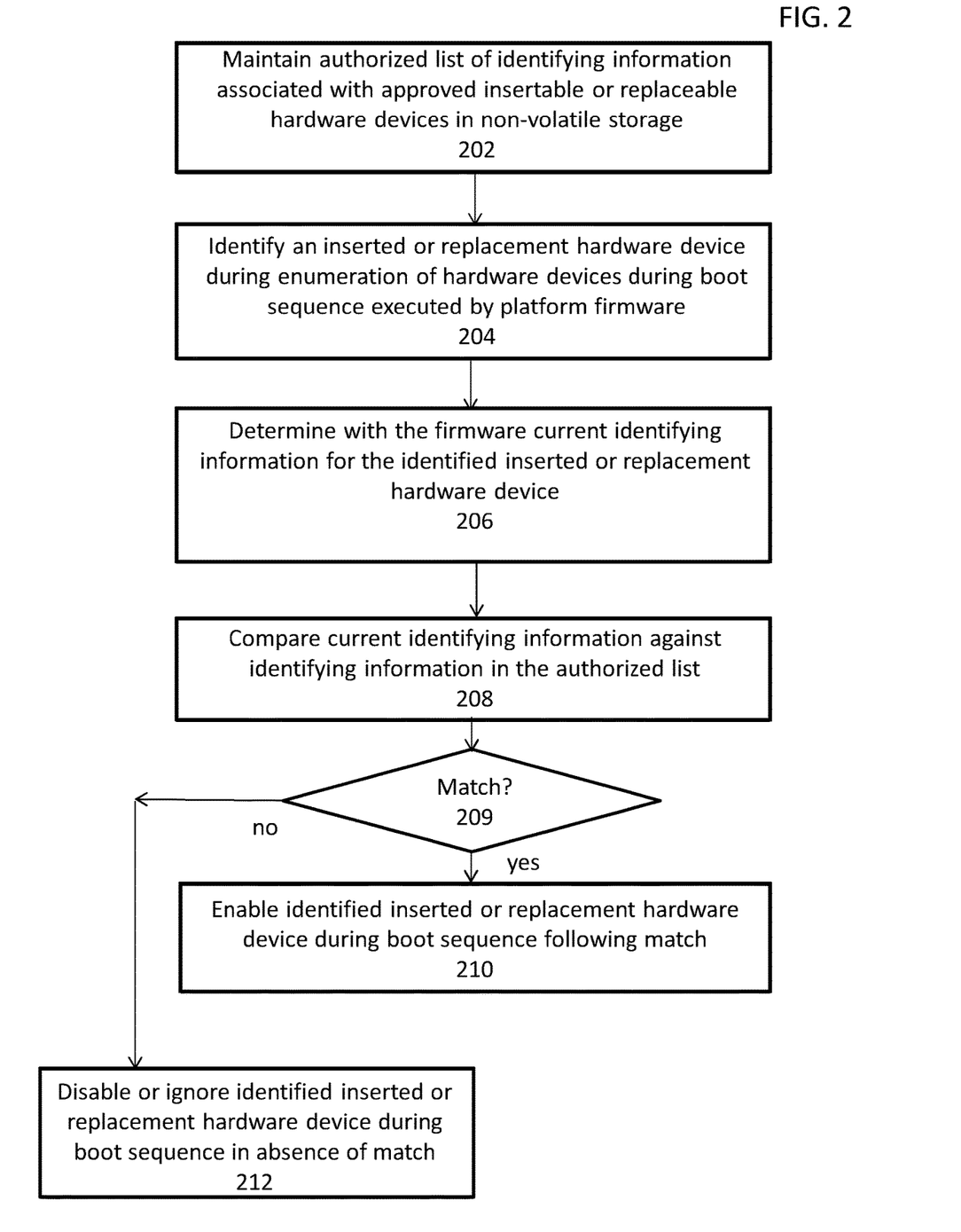
FIG. 2 depicts an exemplary sequence of steps for securely enabling inserted or replacement hardware devices performed during a boot sequence by a secure computing platform in an exemplary embodiment.

FIG. 2 depicts an exemplary sequence of steps for securely enabling inserted or replacement hardware devices performed by a secure computing platform in an exemplary embodiment. The sequence begins with the secure computing platform maintaining an authorized list of identifying information associated with approved insertable or replaceable hardware devices in non-volatile storage (step 202). The non-volatile storage may be but is not limited to a trusted platform module (TPM), flash Read Only Memory (ROM) region, a Unified Extensible Firmware Interfaces (UEFI) variable or storage that is read-only after completion of the boot sequence. During the enumeration of hardware devices during the boot sequence for the computing platform, the platform firmware identifies an inserted or replacement hardware device (step 204). The firmware then determines current identifying information for the inserted or replacement hardware devices identified during device enumeration (step 206) and compares the current identifying information against the stored identifying information in the authorized list (step 208). In one embodiment, the firmware hashes the current identifying information and compares the hash against one or more stored hashes in the authorized list to determine if there is a match. If there is a match determined (step 209), the identified inserted or replacement hardware device is considered authorized and is enabled during the boot sequence (step 210). If there is not a match determined (step 209), the identified inserted or replacement hardware device is disabled or ignored during the device enumeration phase of the boot sequence (step 212).

It should be appreciated that ignoring or disabling discovered hardware devices during the boot sequence may cause device drivers to not be loaded and therefore speed up boot time. It should further be appreciated that although the verification technique described herein is applicable to many types of hardware devices identified during the boot sequence, it has particular applicability for hardware devices that are replaceable or insertable into a secure computing platform.

In some embodiments, embedded systems can use this approach to enabling insertable or replacement hardware devices to lock down the types of devices that can be inserted or replaced in the system. For example, an airport kiosk may have a USB port (either externally in the back or in a locked cabinet) that a service agent may use to insert a USB device holding diagnostic apps and/or firmware updates. In order to prevent launching of a USB descriptor attack where a malformed descriptor or descriptor containing bad data causes the USB software stack to enter an undefined or insecure state, the authorized list may be pre-loaded with the USB device descriptor information. Later, when the service company adds new USB devices, the service agent can return with two USB sticks: one of the previously authorized types and one of the new types. By booting up the kiosk with the first, the service agent may enter the firmware configuration app (setup) and go to a management page where the second device may be enrolled. Similarly, the USB hardware device may also contain information that authorizes it to be a "password" by containing a signed container that is verified by a private key in the secure computing platform.

Figure 3:
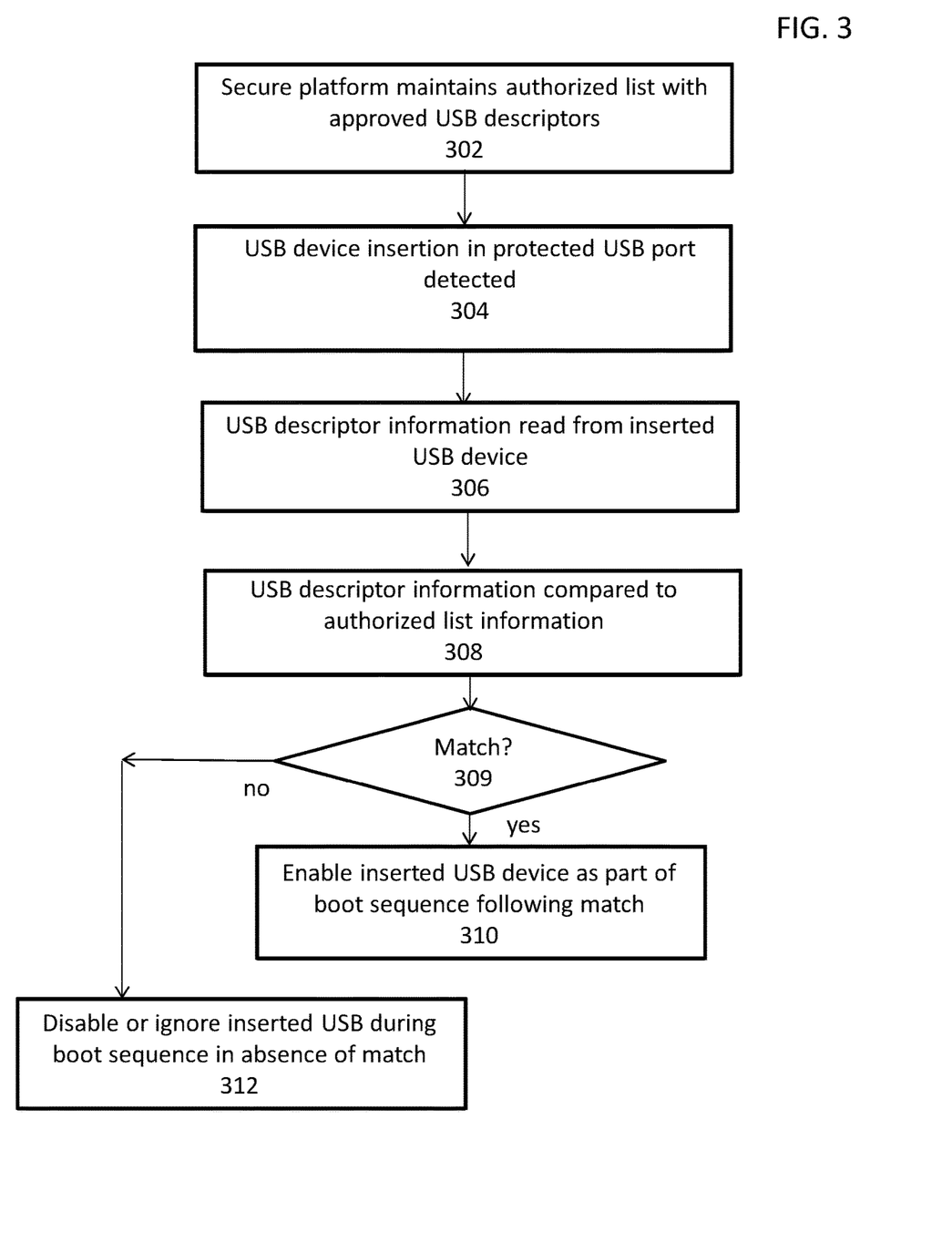
FIG. 3 depicts an exemplary sequence of steps for enabling a USB device that is performed by a secure computing platform in an exemplary embodiment.

FIG. 3 depicts an exemplary sequence of steps for enabling a USB device that is performed by a secure computing platform in an exemplary embodiment. The sequence begins with the secure computing platform maintaining the authorized list with approved USB descriptors in non-volatile storage (step 302). An inserted USB device in a USB port is detected (step 304) and the USB descriptor information is read from the inserted USB device (step 306). The USB descriptor information (or a hash of the same) is compared to stored USB descriptor information (or a hash of the same) in the authorized list. If there is a match determined (step 309), the USB hardware device is enabled during the boot sequence (Step 310). If there is not a match determined (step 309), the USB hardware device is disabled or ignored during the boot sequence for the secure computing platform (step 312).

Figure 4:
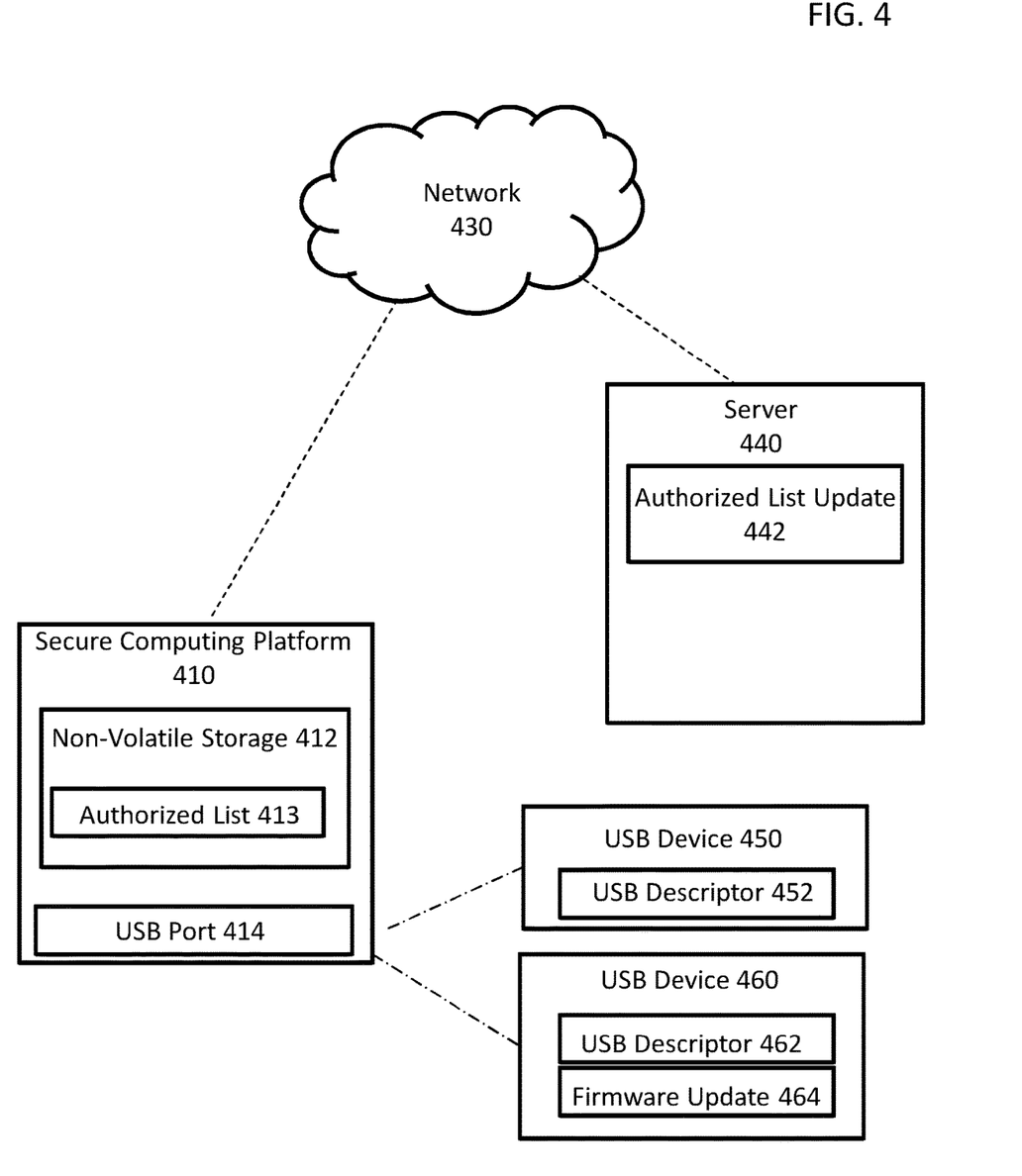
FIG. 4 depicts an exemplary environment suitable for embodiments.

FIG. 4 depicts an exemplary environment suitable for practicing embodiments. A secure computing platform 410 where only components from an authorized vendor list are allowed to be enabled includes non-volatile storage 412 in which an authorized list 413 is maintained. As discussed herein, the authorized list 413 includes identifying information for insertable or replaceable hardware devices. The secure computing platform may include one or more ports such as, but not limited to, USB port 414 into which hardware devices such as USB device 450 and USB device 460 may be inserted. USB device 450 may include USB descriptor 452 containing identifying information for USB device 450 which is provided to the firmware and used to authenticate USB device 450 in the manner described herein. Similarly, USB device 460 may include USB descriptor 462 containing identifying information for USB device 460 which is provided to the firmware and used to authenticate USB device 460. USB device 460 may also include a firmware update 464 which may be executed after USB device 460 has been authenticated. In one embodiment, firmware update 464 may include an update for the authorized list 413. Secure computing platform 410 may also include a network interface (not shown) enabling secure computing platform to communicate over a network 430 with a server 440 that stores an authorized list update 442 that may be provided to secure computing platform 410 over network 430. In one embodiment, authorized list update 442 may be provided using a runtime UEFI service. Network 430 may be the Internet, a local area network (LAN), a wide area network (WAN), an intranet, a cellular network, a satellite network, or some other type of network enabling communication between server 440 and secure computing platform 410.

Figure 5:
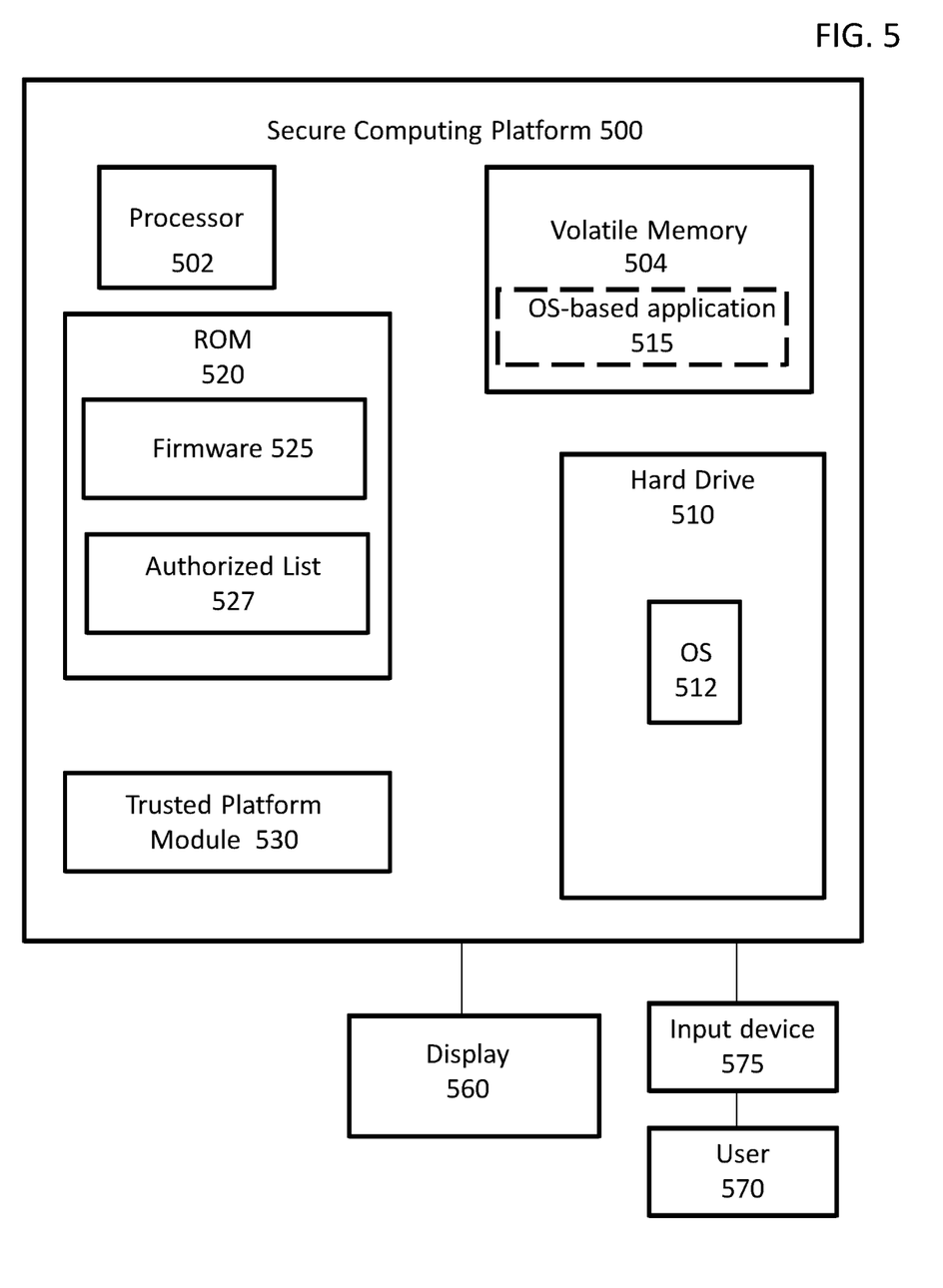
FIG. 5 depicts an exemplary secure computing platform suitable for practicing an exemplary embodiment.

FIG. 5 depicts an exemplary computing platform suitable for practicing an exemplary embodiment. Secure computing platform 500, such as, but not limited to, secure computing platform 410, includes a processor 502 such as, but not limited to a central processing unit (CPU), and volatile memory such as random access memory (RAM) 504. Secure computing platform 500 also includes hard drive 510 holding an operating system (OS) 512. Secure computing platform 500 also includes other types of non-volatile storage such as Read Only Memory (ROM) 520 holding platform firmware 525. ROM 520 may be flash memory and may be provided in the form of one or more NVDIMMS (not shown) that may each include Flash memory, DRAM and a memory controller. Firmware 525 may be executed during a boot sequence for the computing platform 500 as well as at other times. For example, firmware 525 may load OS 512 into volatile memory 504 for execution during the boot sequence and may update firmware data on secure computing platform 500 following a platform reset in response to a request from a UEFI UpdateCapsule( ) runtime service. An OS-based application 515 loaded into RAM 504 may be executed to receive a capsule file and may call a firmware runtime service to initiate the requested update. An authorized list 527 may be maintained in ROM 520 and used by firmware 525 to authenticate inserted or replacement hardware devices during device enumeration as described herein. Alternatively, authorized list 527 may be maintained in trusted platform module 530 or another type of non-volatile storage different from those shown. A user 570 may utilize an input device 575 such as a keyboard or touch screen to interact with secure computing platform 500. Display 560 may be integrated into secure computing platform 500 or may be a separate display surface. Secure computing platform 500 may be, but is not limited to, a desktop personal computer (PC), a server, a laptop, a kiosk, an embedded system, a mobile computing device, a smartphone or some other type of computing device equipped with one or more processors, firmware and non-volatile storage configured to maintain authorized list 527 as described herein.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory medium holding executable instructions for enabling inserted or replacement hardware devices during boot of a secure computing platform equipped with firmware and one or more processors, the instructions when executed by the one or more processors causing the secure platform to:
    maintain in non-volatile storage an authorized list of identifying information associated with approved insertable or replaceable hardware devices;
    identify, during enumeration of hardware devices during a boot sequence executed by the firmware of the computing platform, an inserted or replacement hardware device;
    determine, with the firmware, current identifying information for the identified inserted or replacement hardware device during the boot sequence;
    compare, with the firmware, the current identifying information against identifying information in the authorized list;
    enable the identified inserted or replacement hardware device during the boot sequence based on a match during the comparison.

2. The medium of claim 1, wherein the current identifying information is determined by calculating a hash based on a hardware descriptor for the inserted or replacement hardware device.

3. The medium of claim 1, wherein the identifying information is the device identifier.

4. The medium of claim 1, wherein the identified inserted or replacement hardware device is insertable or attachable to the computing platform.

5. The medium of claim 1, wherein the non-volatile storage in which the authorized list is maintained is a Trusted Platform Module (TPM), a flash Read Only Memory (ROM) region, a Unified Extensible Firmware Interfaces (UEFI) variable or a non-volatile storage location that is read-only after completion of the boot sequence.

6. The medium of claim 1, wherein the instructions when executed further cause the computing device to:
    update the authorized list at runtime by enrolling the inserted or replacement hardware device in response to a command from an authorized user.

7. The method of claim 1, wherein the instructions when executed further cause the computing device to:
    update the authorized list via a firmware update.

8. A method for enabling inserted or replacement hardware devices during boot of a secure computing platform equipped with firmware and one or more processors, comprising:
    maintaining in non-volatile storage an authorized list of identifying information associated with approved insertable or replaceable hardware devices;
    identifying, during enumeration of hardware devices during a boot sequence executed by the firmware of the computing platform, an inserted or replacement hardware device;
    determining, with the firmware, current identifying information for the identified inserted or replacement hardware device during the boot sequence;
    comparing, with the firmware, the current identifying information against identifying information in the authorized list;
    enabling the identified inserted or replacement hardware device during the boot sequence following a match during the comparison.

9. The method of claim 8, wherein the current identifying information is determined by calculating a hash based on a hardware descriptor for the inserted or replacement hardware device.

10. The method of claim 8, wherein the identifying information is the device identifier.

11. The method of claim 8, wherein the identified inserted or replacement hardware device are replaceable or attachable to the computing platform.

12. The method of claim 8, wherein the non-volatile storage in which the authorized list is maintained is a Trusted Platform Module (TPM), a flash Read Only Memory (ROM) region, a Unified Extensible Firmware Interfaces (UEFI) variable or a non-volatile storage location that is read-only after completion of the boot sequence.

13. The method of claim 8, further comprising:
    updating the authorized list at runtime by enrolling the inserted or replacement hardware device in response to a command from an authorized user.

14. The method of claim 8, further comprising:
    updating the authorized list via a firmware update.

15. A secure computing platform, comprising:
    one or more processors;

non-volatile storage configured to maintain an authorized list of identifying information associated with approved insertable or replaceable hardware devices; and firmware that when executed:
- identifies during enumeration of hardware devices during a boot sequence of the secure computing platform, an inserted or replacement hardware device,
- determines current identifying information for the identified inserted or replacement hardware device during the boot sequence,
- compares the current identifying information against identifying information in the authorized list, and
- enables the identified inserted or replacement hardware device during the boot sequence based on a match during the comparison.

16. The secure computing platform of claim 15 wherein the non-volatile storage is a Trusted Platform Module (TPM).

17. The secure computing platform of claim 15 wherein the insertable hardware device is a Universal Serial Bus (USB) device.

18. The secure computing platform of claim 15, further comprising:
- a network interface,
- wherein the network interface is used to receive a firmware update from a remote network location that includes an update of information in the authorized list.

19. The secure computing platform of claim 15 wherein the identifying information associated with approved insertable or replaceable devices is hashed and stored in the authorized list and wherein the firmware when executed further:
- hashes the current identifying information for the identified inserted or replacement device, and
- compares the hash of the current identifying information against at least one stored hash of identifying information in the authorized list.

* * * * *